Sept. 15, 1942. J. C. MEISLER 2,296,174
FISHING ROD
Filed Oct. 31, 1941
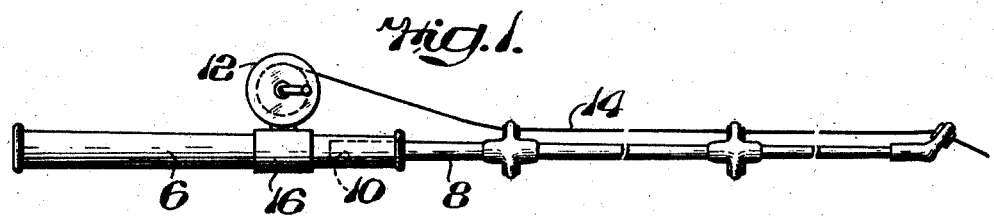
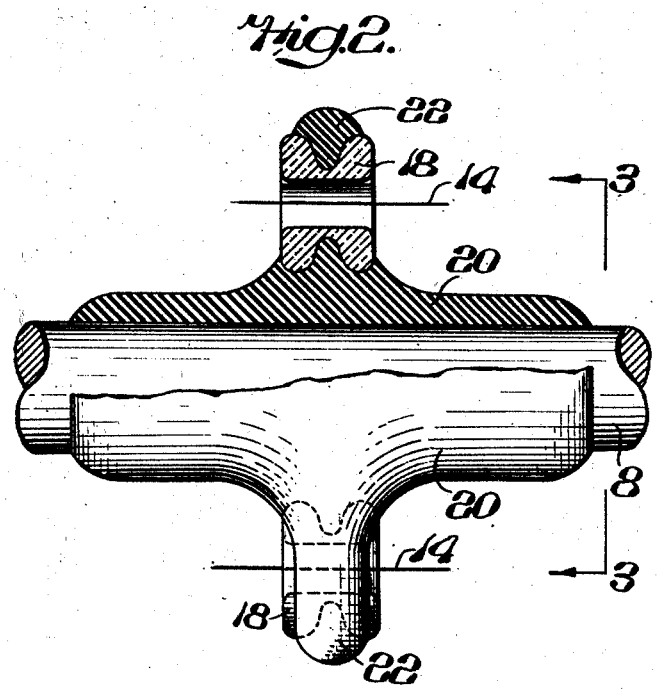
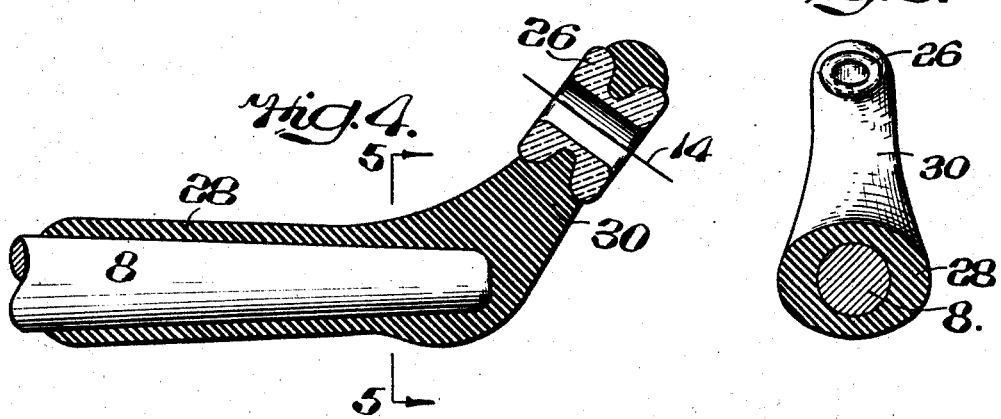
INVENTOR
JOHN C. MEISLER
BY
ATTORNEY Patented Sept. 15, 1942

2,296,174

UNITED STATES PATENT OFFICE 2,296,174

FISHING ROD

John C. Meisler, Philadelphia, Pa.

Application October 31, 1941, Serial No. 417,217

2 Claims. (Cl. 43—24)

Fishing rods heretofore known, made and used have consisted of a flexible tapering body made of one or more pieces with the thick or butt piece constituting the handle and supporting the reel and with guide rings or eyelets made of glass or agate or polished metal conveniently spaced along the length of the rod through which the fishing line passes. Such guide rings have heretofore consisted of a metal ring enclosing the agate, glass or other polished surface, the metal ring having oppositely disposed legs of an inch or more in length extending longitudinally of and resting upon the rod and being secured to the rod by a tight winding of silk thread or the like. This construction is satisfactory as far as the guiding of the fishing line is concerned but I have found that the metal legs and the metal frames supporting the guide rings as now applied to the rod together with the winding securing them to the rod impart to the rod a certain amount of rigidity at the points where the metal frames referred to are secured thus detracting from the flexibility and whip action of the rod. This not only interferes with the efficiency and gracefulness of the cast, especially in surf fishing, but also results in breakage at these comparatively rigid points when the rod is subject to undue strain either in casting or in reeling in a hooked fish. The same remarks apply to the end or tip of the rod which in present day construction is provided with an elongated metal sleeve adapted to fit over the tapered tip of the rod and supporting at its extremity another guide ring disposed at an obtuse angle with respect to the axis of the rod.

It is very desirable in fishing rods to combine minimum weight with maximum strength and flexibility and, when it is considered that the weight of rods of this kind are measured in terms of ounces, two or three guide eyelets together with the tip when made of metal add weight to the rod.

It is therefore the object of my invention to provide novel means for mounting the guide rings along the length of the rod as well as the final guide ring at the tip thereof in a manner which will increase the flexibility to improve the action and at the same time to reduce the hazard of breaking and also reduce the weight.

Other novel features of advantage and construction will be more clearly understood from the following specification and the accompanying drawing in which:

Fig. 1 represents in side elevation a view of a conventional fishing rod equipped with guide ring supports embodying my invention.

Fig. 2 represents, on a greatly enlarged scale, a view partly in section and partly in elevation of one of the guide ring supports embodying my invention.

Fig. 3 represents a section on line 3—3 of Fig. 2.

Fig. 4 represents a view partly in section and partly in elevation of the guide ring support used at the tip or end of the rod.

Fig. 5 represents on a reduced scale, a section on line 5—5 of Fig. 4.

Referring to the drawing in which like reference characters indicate like parts, I have shown in Fig. 1 a conventional fishing rod comprising the butt or handle 6 and what is known as the "tip" or body of the rod 8. The butt 6 is conventionally provided with a socket 10 into which the end of the body 8 is inserted as shown in dotted lines in Fig. 1. 12 designates a conventional reel which carries the line 14 and which is suitably secured to the butt by any desired clamp 16. In lieu of the metal frames carrying the agates or glass rings 18 I utilize a rubber sleeve 20 of the desirable resiliency which is provided with a tapered bore so that it may be slipped over the thin tapered end of the body 8 as far back towards the butt as it will go which will automatically position it at a predetermined point. As illustrated in Fig. 2 no regard has been given to dimensions, the purpose being merely to illustrate the construction as clearly as possible. The sleeve 20 is provided with oppositely disposed ears 22 in which are premolded the guide rings 18 which may be of glass, agate, or any other wear-resisting material which is capable of high polish, it being understood that if desired only one of the ears 22 on one side can be used, but it is conventional to have oppositely disposed guide rings so that one may be used for sometime and, if the rod shows a tendency to bend in that direction, the other ring can be used to counteract that tendency. As will be seen from Fig. 1, any desired number of sleeves 22, such as that shown in Fig. 2, can be used according to the length of the rod and the purpose to which it is to be put. Likewise, at the thin end or extremity of the body 8 of the rod, instead of utilizing a metal sleeve having a frame for supporting the extreme guide ring 26 I utilize another sleeve 28 also made of material having the desired resiliency and having a tapered bore which fits over the tapered end of the rod as clearly shown in Fig. 4. The tapered sleeve 28 is provided with an extension 30 disposed at a suitable angle with respect to the axis of the rod and in the extension 30 is embedded the guide ring 26 through which the line 14 passes. The use of the flexible sleeves, in addition to the advantages above set forth, also reduces the cost of manufacture in that it is easier to mold the guide rings 24 or 26 in the flexible material while the latter is being manufactured as distinguished from inserting a glass or agate guide ring in a metal ring, and it also reduces the cost in that the sleeve 20 or 28 need only be slipped over the rod into position as distinguished from the silk winding necessary to secure the metal frames of the guide rings 18 in position or the glue or screw which is used to hold the conventional metal tip at the end of the rod in position. As is well known, the moisture, particularly from salt water, tends to rot the silk winding and to corrode the metal frames supporting the guide rings as well as the metal tip surrounding the extreme or end guide ring so that the flexible sleeves 22 or 28 of my invention, which can be made of any suitable rubber composition, will be much more resistant to corrosion. Also, when the fishing season is over, it is a simple matter to remove the sleeves 22 and 28, clean them, dry them and put them away, all of which can not be done with the metal supports of the guide rings when the latter are secured permanently to the rod by silk winding or other conventional means.

Having thus described my invention, what I claim as new and desire to secure by Letters Patent is:

1. The combination with a fishing rod of means for guiding the line of said fishing rod comprising, a molded flexible open-ended sleeve adapted to be slipped onto said fishing rod over the thin end thereof, an integrally formed extension projecting at an angle to the axis of said sleeve and said rod, and a guide ring premolded in said extension.

2. A support for the guide ring for the line of a fishing rod comprising, a sleeve having a tapered internal bore adapted to fit over and to engage a correspondingly tapered portion of said fishing rod, an integrally formed extension disposed at an angle to the axis of said sleeve and said fishing rod and in which said guide ring is embedded, said sleeve and said extension being formed of flexible elastic material.

JOHN C. MEISLER.